Oct. 15, 1968 R. DUMANCHIN 3,406,354
CRYSTAL LASER DEVICE
Filed Dec. 17, 1963
FIG. 1
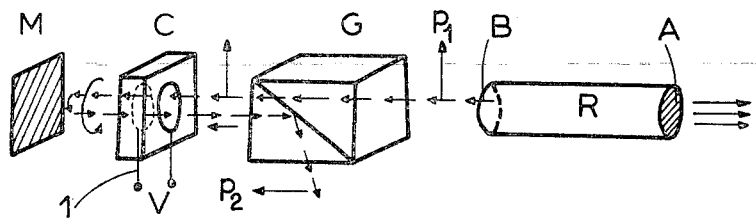
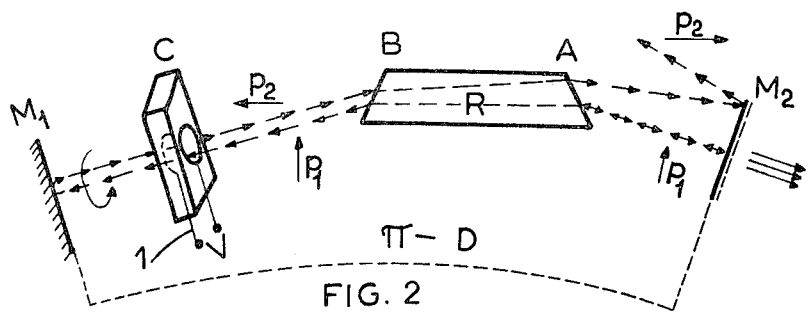
FIG. 2
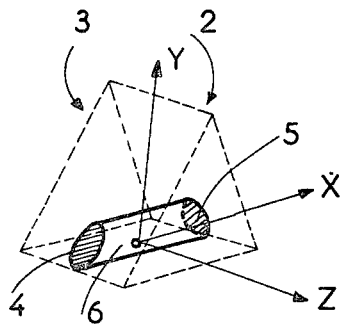
FIG. 3
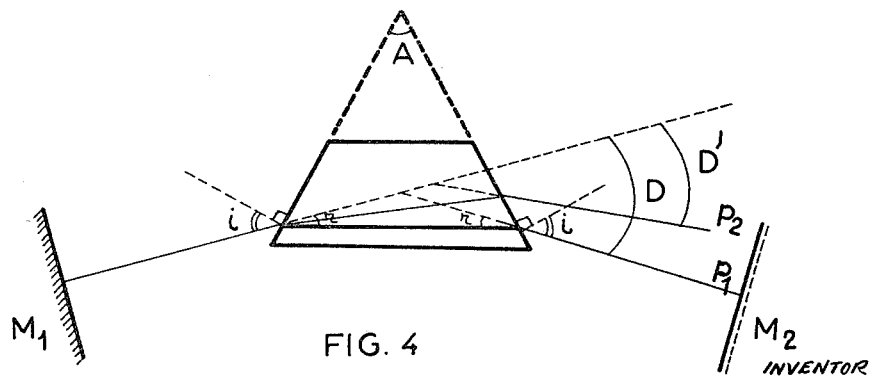
FIG. 4
INVENTOR
ROGER DUMANCHIN
BY Paul M. Craig, Jr.
ATTORNEY

United States Patent Office 3,406,354
Patented Oct. 15, 1968

3,406,354
CRYSTAL LASER DEVICE
Roger Dumanchin, Montgeron, France, assignor to
Compagnie Generale d'Electrite, Paris, France
Filed Dec. 17, 1963, Ser. No. 331,247
Claims priority, application France, Dec. 17, 1962,
918,839
6 Claims. (Cl. 331—94.5)

ABSTRACT OF THE DISCLOSURE

A crystal laser device able to emit polarized light and comprising an optically resonant cavity including two mirrors, a birefringent crystal and a phase shifting cell all optically aligned to sustain laser oscillations. The crystal is a body of birefringent material having an optical axis such that the light path through the crystal during laser oscillation is perpendicular to the optical axis. The end faces of the crystal through which the light path passes lie in planes which intersect in a line parallel to the optical axis. The said planes are equally inclined to the direction of the light path through the crystal. The mirrors comprising the optical resonant cavity are perpendicular to the light beam leaving the crystal when the polarization of the beam is not modified by the phase shifting cell.

---

The object of the present invention is to effect improvements in crystal type laser oscillators and, in particular, as regards control of oscillation.

Control of a laser enables obtention of very short-duration impulses of monochromatic and coherent light the very high peak power of which can attain values of the order of 50 MW.

The coherence and the very high peak power of the laser emission affords many applications in all fields where very high power impulses are required and, in particular, in the case of optical radars (lidars). The very great directional capability of the beam can assure focussing on to an area of the order of one micron, a very important property which can be put to use in chemistry and surgery.

In the case of solid lasers, the laser oscillation is obtained by placing the crystal in a resonant cavity, which is generally of the Fabry and Perot type. These echoing optical cavities, consist of two plane mirrors one of which must possess a reflection factor of a few percent making it possible to capture the emission stimulated in the crystal; this emission, which possesses, in general, particularly good directional capability, is captured along an axis perpendicular to the said mirrors. Laser oscillation can only appear if the cavity, in which the crystal has been placed, has a sufficiently high resonance quality factor, or Q factor.

In order to obtain a laser emission in the form of a short-duration impulse, in particular with a view to the above-mentioned applications, the laser is controlled by convenient modulation of the Q factor of the resonant cavity.

For this purpose, the technique usually employed consists of modulation of feedback by shuttering or by rotation of an external reflector, and is referred to as "Q-spoiling." Because of the losses introduced when feedback is removed, the Q is destroyed to the extent that the oscillation condition is not satisfied. When the feedback is restored, the laser can be pumped to near total population inversion, and permits the emission of an output beam in the form of a single, stimulated radiant pulse.

It is proposed to cut the amplifier crystal of the laser in such a manner that the laser emission is polarized in a certain direction as in the case of a crystal cut to the shape of a right circular cylinder the principle axis of symmetry of which is perpendicular to the optical axis. An analyzer has then been placed in the echoing cavity, between the totally reflecting mirror and the crystal, to enable extinction of the light beam.

On the other hand, it has been proposed that use be made of a single axis ruby crystal cut to the shape of a right circular cylinder the principal axis of symmetry of which is parallel to the optical axis, by interposing an analyzer and a polarizer between the totally reflecting mirror and the crystal. This solution, however, is without interest since the emission stimulated is, on principle, not polarized and, in this case, a large amount of energy is lost.

It has also been proposed to use a crystal cut in such a manner as to emit polarized light. The resonant cavity, including opposed mirrors, is also provided with:

(a) A polarizer, for instance a Nicol prism which has the capability of deviating all polarized light beams except those polarized in one given plane.

(b) A phase shifting cell which can be made of a liquid (such as nitrobenzene) contained within two glass walls, or a crystal such as monopotassic phosphate. This cell is provided with electrodes to apply an electric field to it. When no electric field is applied to the cell, a light beam, polarized or not, travels through the cell without any modification in direction or polarization. When an electric field is applied to the cell, a polarized light beam is modified by Pockel or Kerr effect (according to the direction of the applied electric field) and its polarization plane turns about the direction of the beam. It will be explained hereinafter how such a device can be used to switch the feedback presented to the crystal and thus to control the onset of laser oscillation.

Such a device presents a certain number of faults of which the most important are due to:

(1) The difficulty of making and positioning the various optical components contained in the cavity.
(2) The insufficient field of these components (great power losses through attenuation and reflection in the polarizers).
(3) The special and delicate optical treatments necessary to diminish power losses through reflection.
(4) The brittleness of the non-reflecting layers obtained.
(5) The bulk of the components disposed within the cavity resulting in prohibitive dimensions of the assembly.

The invention described in these specifications proposes to greatly reduce the disadvantages mentioned hereabove.

The invention is comprised by a laser crystal able to emit a polarized light beam and placed in an optically resonant cavity including two mirrors and a phase shifting cell. It is characterised in that the crystal is a body of birefringent material having one optical axis and the light path through the crystal during oscillation is perpendicular to said axis. The end faces of the crystal through which said light path passes lie in planes intersecting along a line parallel to the optical axis, the said planes being equally inclined to the direction of the light path through the crystal. The mirrors constitute the said optical resonant cavity and are perpendicular to the light beam leaving the crystal when the polarization of the beam is not modified by the phase shifting cell.

Other characteristics of the invention will appear in the description which is to follow.

The invention will be well understood, reference being made to the attached drawings, which are given for solely illustrative and, in no way, limitative purpose among which:

FIGURE 1 represents a diagrammatic section of a laser with a known control system.

FIGURE 2 represents a diagrammatic section of a laser with a control system following the invention.

FIGURE 3 represents a view of the laser crystal displaying the manner in which it has been cut.

FIGURE 4 represents a diagrammatic section of the laser, which is following the invention and displaying the passage of light beams.

FIGURE 1 represents a laser oscillation control device which has been in use up to the present.

The echoing cavity is formed by two mirrors, the first, represented at M on FIGURE 1, is a mirror the reflection power of which is, on principle, 100%, the second mirror is achieved simply by covering facet A of crystal R with a layer of silver the reflecting power of which should be, on principle, of the order of 93%.

This is the crystal from which it is proposed to catch the stimulated emission of light known as the laser emission. This crystal is normally uniaxial and consists, for example, of a ruby.

An example of the manner of cutting a crystal (according to the invention), is illustrated in FIGURE 3. The crystal shown in FIGURE 3 is cut to the shape of a right circular cylinder, the generators of which are perpendicular to the optical axis of the crystal. The laser emission from the crystal is then 100% polarized in a straight line. Of course, the device of FIGURE 1 is not limited to use with a crystal having this type of layout and to have a crystal in the shape of a rectangular or oblique parallelepiped, it being possible for the straight section of the prism to have any type of polygonal contour.

Between the totally reflecting mirror M and the crystal R are disposed two cells C and G. Cell C, known as the dephasing or control cell is, either a lamina-cut crystal with parallel facets or a liquid retained between two vitreous walls. Means, shown in diagram form of electrodes 1, are provided to vary the optical properties of this cell:

(1) through application of the Kerr effect in the case of the use of a liquid, such as nitrobenzene, the electrical field engendered by the electrodes being perpendicular to the direction of travel of the light beam.
(2) through application of the Pockel effect in the case of the use of crystals, such as monopotassic phosphate, the electrical field engendered by the electrodes being parallel to the direction of travel of the light beam.

The electrical field in both these cases engenders birefringence which gives the cell the property of modifying the polarization of the light wave going through the cell. A light beam, polarized in a given plane, is modified after passing through the cell in such a way that its polarization plane undergoes a 90° angular rotation, if the phase shifting is equal to half a wave length. Cell G is, for example, a Nicol prism, or a Glan or Glazebrook type prism, all of which behave as polarizers. In the practical example shown in FIGURE 1 the light beam emitted by crystal R is polarized in a plane $P_1$ which is parallel to the plane of the figure and which corresponds to the polarization plane of prism G.

The light beam polarized in plane $P_1$ first passes through prism G without being modified. If laser oscillation is to be curtailed, a voltage is applied to cell C which is chosen at such a value that the polarization plane of the beam is rotated, and upon being reflected by mirror M and subsequently passing back through prism G, it is polarized in plane $P_2$ (plane of the figure). As a consequence the beam will be completely eliminated after the second passage through the cell C. If no voltage is applied to cell C, the beam undergoes no modification when passing through cell C, and can freely travel to and fro between mirrors A and M. The laser oscillation can take place because a large power can be stored inside the cavity, which is a necessary condition for the onset of laser emission. If a voltage is applied to cell C, the phase is shifted at each passage through the cell C, and the beam is eliminated on passing through prism G, in the direction from C to G as explained above, and no power storage can be made inside the cavity.

The first crossing of cell C by the beam results in the transformation of the rectilinear polarization into circular polarization; after being reflected on mirror M, the beam returns across dephasing cell C and the polarization at outlet becomes rectilinear but in plane $P_1$ (plane of the figure).

In order to obtain this result, the voltage applied to the electrodes of the dephasing cell must be of a determined value $V_0$. In this case, the beam leaving cell C is completely eliminated by extinction in cell G.

If the dephasing cell is under voltage, it behaves as a simple glass piece with parallel facets.

The laser oscillation, therefore, cannot take place unless cell C is under voltage $V_0$. Voltage $V_0$ is applied until the power stored in the crystal is at a maximum, this current is then cut in a very short space of time and the laser oscillation is released instantaneously thus liberating the accumulated power in one impulse of very high peak power.

The presence of cell G results in a certain number of disadvantages:

(1) Losses through attenuation
(2) Losses through reflection
(3) Bulk.

Power losses through reflection on the facets of cell G can be lessened by a convenient anti-reflection treatment. These treatments result, in turn, in the disadvantage represented by their expensiveness, anti-reflection layer being also rather brittle.

Losses through the attenuation inherent to this type of assembly cannot be eliminated entirely.

The control device according to the invention makes it possible to do away with these disadvantages whilst affording new advantages which will appear in the following description.

FIGURE 2 represents a diagrammatic section of a device according to the invention. In FIGURE 2, the resonant cavity is made of two mirrors $M_1$ and $M_2$ which form an angle, the value of which will be hereinafter specified. The laser crystal R is placed between the mirrors $M_1$ and $M_2$, and a cell C, of the same type as that described with reference to FIGURE 1, is placed between mirror $M_1$ and crystal R.

FIGURE 3 shows the laser crystal R employed in the device of FIGURE 2. The crystal is first cut to the shape of a cylinder the lateral surface of which is given reference numeral 6. The generatrices of this cylinder are chosen to be perpendicular to one of the optical axes of the crystal. The end faces of the cylinder lie in planes which form a dihedron such as that represented by the dotted lines in FIGURE 3, the common intersection line of these planes being parallel to that optical axis of the crystal which is perpendicular to the generatrices. By reason of this arrangement, a ray of light whose direction is parallel to the generatrices of the cylinder, i.e. at OX, crosses the crystal without being modified as to its polarization. The crystal, cut as stated hereabove, is birefringent, the light being divided into two beams, one of them travelling at a velocity $c/n_1$, the other beam at a velocity $c/n_2$, c being the velocity of light, and $n_1$ and $n_2$ being the refractive indices of the crystal. The polarization planes of the beams are YOX and ZOX, respectively. If the crystal is cut in such a manner that one of the optical axes corresponds to the axis OZ in FIGURE 3, the polarization plane $P_1$ of the laser emission is the plane of the figure YOX. As a consequence, the laser emission beam travels with a velocity $c/n_1$ where $n_1$ is the higher of the two refractive indices of the crystal.

Taking A as the angle of the prism. For symmetrical deviation of the light beam, the angle of incidence must be such that (FIGURE 4):

$$\sin i = n_1 \sin r$$
$$r = A/2$$

hence:

$$\sin i = n_1 \sin \frac{A}{2}$$

An interesting value for the angle of incidence is given by Brewster's law according to which there is no loss through reflection for an incidence such as: $\tan i = n_1$.

The dihedral angle, at which the facets of the laser crystal are cut, therefore, should be well according to the following equations:

$$\sin \frac{A}{2} = \frac{\sin i}{n_1}$$

On leaving the crystal, the deviation of the light beam will have the following value:

$$D = 2i - A$$

$i$ being Brewster's angle of incidence such that $\tan i = n_1$

For laser oscillation to take place, the beam entering the laser crystal and the beam leaving must be at right angles, respectively, to mirrors $M_1$ and $M_2$. The angle formed by mirrors $M_1$ and $M_2$ shall be, in consequence, as follows:

$$\pi - D = \pi - 2i + A$$

As an example, in the particular case of the use of a single axis ruby crystal, the numerical data is as follows:

$$r = A/2 = 29°36'$$

the deviation corresponding to Brewster's incidence will then be $60°54'20''$ for a polarized wave according to $P_1$ and corresponding to indication $n_1$.

The laser oscillator control device functions in the following manner: in the absence of a voltage at electrodes 1 (FIGURE 2) cell C behaves like a glass with parallel facets without modifying the state of polarization of the light beam passing through it, the polarization plane of said beam being shown at $P_1$. Thus, the light beam can travel to and fro between the mirrors $M_1$ and $M_2$ which are both reached at normal incidence and a great amount of power can be stored in the resonant cavity, a large population inversion can be attained and the oscillation conditions for a stimulated radiant emission pulse are satisfied.

When voltage is applied to electrodes 1 of phase shifting cell C, the polarization of the light beam crossing this cell is modified and the beam becomes polarized elliptically or circularly according to the value of the voltage. After being reflected on the mirror $M_1$ the beam is again subjected to a phase shift, which adds to the previous shift. If the voltage is chosen to have such a value that after the first passage through the cell, the beam is circularly polarized, the second passage modifies the state of polarization of the beam which becomes again linearly polarized but in a plane at right angles to $P_1$. This new polarization plane of the light beam is parallel to plane ZOX in FIGURE 3. The light beam then falls on the the crystal and passes through it with a velocity $c/n_2$, corresponding to the refractive index $n_2$. The deviation of the beam is now $D'$ (as shown in FIGURE 4), and is different from deviation D corresponding to a normal incidence of the beam on mirror $M_2$.

If the difference in these deviations exceeds a value of over 20 minutes, oscillation conditions are no longer fulfilled and the laser emission stops very rapidly. This difference in deviation is equal to $dD = 2 \, dn$, $dn$ being equal to $(n_0 - n_1)$.

In order to obtain a laser emission with very short impulses and with high peak power, with cell C having voltage applied thereto, the said voltage is very sharply cut when the energy stored in the cavity is at its maximum. The oscillator then emits, for a very short period, a beam which is all the stronger the faster the current is cut.

The advantages afforded by this control device are multiple, in particular:

(1) Lessening in the bulk of the oscillator through deletion of cell G of the device according to FIGURE 1.

(2) Elimination of losses through reflection in cell G and, furthermore, losses through attenuation.

(3) Lessening of losses through reflection on the laser crystal or even total elimination of these losses through use of a light beam at Brewster's incidence.

(4) Deletion of anti-reflection treatment to the crystal.

(5) More robust construction of the oscillator by reason of the layout of oscillator components as shown in FIGURE 2.

I claim:

1. A crystal laser device able to emit a polarized light beam comprising an optically resonant cavity including two mirrors, a birefringent laser crystal and a phase shifting cell all optically aligned to sustain laser oscillations, the crystal being a body of birefringent material having an optical axis with the light path through the crystal during laser oscillation being perpendicular to said optical axis, and the end faces of the crystal through which the said light path passes lying in planes intersecting in a line parallel to the optical axis, the said planes being equally inclined to the direction of the light path through the crystal, said mirrors comprising the said optical resonant cavity being perpendicular to the light beam leaving the crystal when the polarization of the beam is not modified by the phase shifting cell.

2. A device according to claim 1 in which the angle A between the planes of the end faces of the crystal satisfies the relation:

$$\sin \frac{A}{2} = \frac{\sin i}{n_1}$$

where $\tan i = n_1$ in which $i$ is the incidence angle of the light beam on the crystal and $n_1$ is one of the refractive indices of the crystal.

3. A device according to claim 2 in which the crystal is an uniaxial crystal.

4. A device as claimed as claim 3 in which the crystal is made of ruby.

5. A device according to claim 2 in which the phase shifting cell is made of a birefringent material, the difference between its two refractive indices being a function of the value of an electric field applied to it.

6. A device according to claim 2 in which the incidence angle ($i$) of the light beam on the crystal is Brewster's angle of incidence.

References Cited

UNITED STATES PATENTS

| 3,229,223 | 1/1966 | Miller | 88—61 X |
| 3,248,667 | 4/1966 | Johnson et al. | 331—94.5 |

FOREIGN PATENTS

| 608,711 | 3/1962 | Belgium. | |

DAVID H. RUBIN, *Primary Examiner.*

P. R. MILLER, *Assistant Examiner.*